United States Patent [19]

Ernst

[11] Patent Number: 4,743,754
[45] Date of Patent: May 10, 1988

[54] LENGTH- OR ANGLE-MEASURING ARRANGEMENT

[75] Inventor: Alfons Ernst, Traunreut, Fed. Rep. of Germany

[73] Assignee: Dr. Johannes Heidenhain GmbH, Traunreut, Fed. Rep. of Germany

[21] Appl. No.: 64,994

[22] Filed: Jun. 18, 1987

[30] Foreign Application Priority Data

Jun. 25, 1986 [DE] Fed. Rep. of Germany ....... 3621236

[51] Int. Cl.$^4$ .......................... G01D 5/34; H01J 3/14; G01B 11/00
[52] U.S. Cl. ............... 250/237 G; 250/231 SE
[58] Field of Search ............ 250/237 G, 231 SE, 239; 340/347 P; 33/125; 356/395

[56] References Cited

U.S. PATENT DOCUMENTS

| | | | |
|---|---|---|---|
| 4,079,252 | 3/1978 | Brake | 250/237 G |
| 4,375,592 | 3/1983 | Cox et al. | 250/231 SE |
| 4,426,457 | 10/1984 | Kondo | 250/231 SE |
| 4,517,742 | 5/1985 | Ernst | 250/237 G |
| 4,573,000 | 2/1986 | Nelle | 250/237 G |
| 4,602,436 | 7/1986 | Ernst | 250/237 G |
| 4,606,642 | 8/1986 | Nelle | 250/237 G |
| 4,656,347 | 4/1987 | Une et al. | 250/237 G |

Primary Examiner—David C. Nelms
Assistant Examiner—Michael Messinger
Attorney, Agent, or Firm—Willian Brinks Olds Hofer Gilson & Lione Ltd.

[57] ABSTRACT

A length- or angle-measuring arrangement for measuring the relative position of two objects. A graduation (Ta) lies in a graduation plane (TEa) of a graduation carrier (TTa) which is connected with one of the objects outside the neutral plane (NEa) of the graduation carrier (TTa). The graduation carrier (TTa) is scanned by means of a scanning graduation (ATa) in a scanning graduation plane (ATEa) of a scanning unit (Aa) which is connected with the other object. To eliminate measuring errors brought about by bendings of the graduation carrier (TTa), the scanning graduation (ATa) of the scanning unit (Aa) is arranged in the neutral plane (NEa) of the graduation carrier (TTa).

4 Claims, 3 Drawing Sheets

LENGTH- OR ANGLE-MEASURING ARRANGEMENT

BACKGROUND OF THE INVENTION

The present invention relates to a length- or angle-measuring arrangement.

Such absolute or incremental position-measuring systems may be used, for example, in processing machines which measure the relative position of a tool with respect to a workpiece to be processed or in coordinate-measuring machines which determine position and/or dimensions of test objects.

German unexamined patent specification OS No. 17 73 403 discloses that measuring errors will result in a length-measuring arrangement having a graduation carrier whose graduation plane containing the graduation lies outside the neutral plane of the graduation carrier when the graduation carrier bends while in its use position.

In one such length-measuring arrangement the graduation carrier for the graduation has, for example, a rectangular cross section, whose one surface forms the graduation plane with the graduation. Since this graduation plane with the graduation lies outside the neutral plane on the graduation carrier, bending of the graduation carrier in its use position creates expansions or compressions of the graduation plane with the graduation causing measuring errors. The neutral plane of the graduation carrier is the sole plane which does not undergo any change in length, either by expansion or compression upon bending of the graduation carrier.

German Pat. No. 25 10 219 describes a lengthmeasuring arrangement with a graduation carrier whose graduation plane with the graduation lies outside the neutral plane of the graduation carrier. The graduation is scanned by a scanning unit which is coupled to an object to be measured and to an auxiliary guide independent of the guidance of the object to be measured. To avoid measuring errors resulting from the bending of the graduation carrier in its use position, the scanning unit is coupled to the object to be measured at the height of the neutral plane of the graduation carrier articulately by means of coupling elements. Such an articulated coupling of the scanning unit in the neutral plane of the graduation carrier is relatively expensive and space consuming, and therefore may not be used in all measuring arrangements.

In order to avoid such measuring errors arising from the bending of the graduation carrier, there have been proposed graduation carriers with a U-shaped cross section or with an H-shaped cross section, wherein the neutral plane forms the graduation plane with the graduation.

Such an arrangement of the graduation plane with the graduation in the neutral plane of the graduation carrier nevertheless, however, yields measuring errors from the bending of the graduation carrier in measuring systems in which the graduation of the graduation carrier is scanned by a scanning unit in the direct light process with relatively great scanning distance and in which, therefore, the graduation plane forms with the graduation of the graduation carrier a plane of reflection. The parallel light beams produced in a scanning unit from a light source by means of a condenser pass through the scanning graduation on the scanning plane, fall upon the graduation plane with the graduation of the graduation carrier, and are reflected from this graduation plane as a reflection plane back onto the scanning graduation plane with the scanning graduation. The graduation plane of the graduation carrier acts, accordingly, as an optical element that images the scanning graduation again onto the scanning plane. Through the counter-running movement of the graduation of the graduation carrier and of the image of the scanning graduation on the graduation plane of the graduation carrier, the light beams are modulated and transformed by way of a photo-element into an electrical periodic scanning signal. The signal is fed to an evaluating means which generates measurement values representing the relative positions of the two objects.

The graduation plane of the graduation carrier and the scanning graduation plane of the scanning unit face one another at a certain parallel spacing, a. On a bending of the graduation carrier, there is produced in an arbitrary place of the graduation plane, an incline of angle $\alpha$, which displaces the image of the scanning graduation by an interval $2\alpha a$ on the scanning graduation plane in one direction. If the graduation carrier with the graduation is shifted in the opposite direction through the interval $\alpha a$, the displacement of the image of the scanning graduation through the interval $2\alpha a$ on the scanning graduation plane is nullified. Thus, the inclination angle $\alpha$ causes a measuring error $\alpha a$.

An object of the present invention is therefore to eliminate measuring errors in a length- or angle-measuring arrangement in which a graduation lying in a graduation plane of a graduation carrier lies outside the neutral plane of the graduation carrier. Other objects of the present invention will become apparent from the following description when taken in conjunction with the accompanying drawings.

SUMMARY OF THE INVENTION

In accordance with the present invention, there is provided a length- or angle-measuring arrangement for measuring the relative position of two objects wherein a graduation in a graduation plane of a graduation carrier connected with one of the objects lies outside the neutral plane of the graduation carrier. The graduation in the graduation plane of the graduation carrier is scanned by means of a scananing graduation in a scanning graduation plane of a scanning unit. The scanning unit is connected to the other of said objects. In order to avoid measuring error, the scanning graduation plane with the scanning graduation of the scanning unit is arranged in the neutral plane of the graduation carrier.

The advantages of the arrangement of the present invention will become apparent from the following description, which when taken in conjunction with the accompanying drawings, discloses presently preferred exemplary embodiments of the present invention. It should be understood, however, that this description is intended to be illustrative rather than limiting, the scope of the present invention being defined by the appended claims.

BRIEF DESCRIPTION OF THE DRAWINGS

Presently preferred exemplary embodiments of the invention summarized above are illustrated in the accompanying drawings.

DETAILED DESCRIPTION OF THE DRAWINGS AND PREFERRED EMBODIMENTS

In accordance with the present invention, it has now been discovered that by arranging the scanning graduation plane with the scanning graduation in the neutral plane of the graduation carrier, measuring errors caused by bendings of the graduation carrier in its use position on the object to be measured are easily and completely obviated without additional elements. Therefore, there is provided in accordance with the present invention, a simply constructed and economical measuring system of high measuring precision. This high measuring precision, for example, substantially reduces down time and rejects in processing machines in which such measuring arrangements are used, and substantially improves their operating efficiency.

Figure 1:
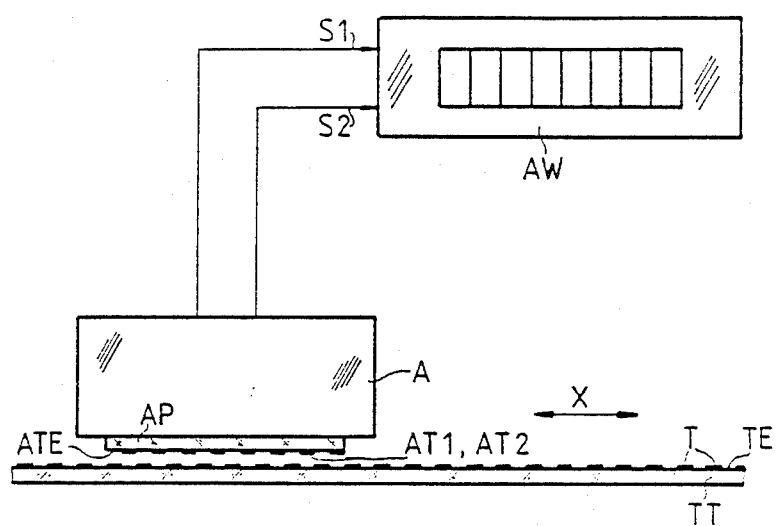
FIG. 1 is a schematic representation of a photoelectric incremental length-measuring system in a side view.

FIG. 1 schematically represents a photoelectric incremental length-measuring system in a side-view, wherein a graduation T is scanned free of contact in a graduation plane TE of a graduation carrier TT by a scanning unit A. The graduation carrier TT and the scanning unit A are connected in a manner not shown in each case with two shiftable objects, the reciprocal relative position of which is to be measured. Thus, for example, the graduation carrier TT and scanning unit A may be connected with a slide piece and with the bed of a processing machine.

Figure 2:
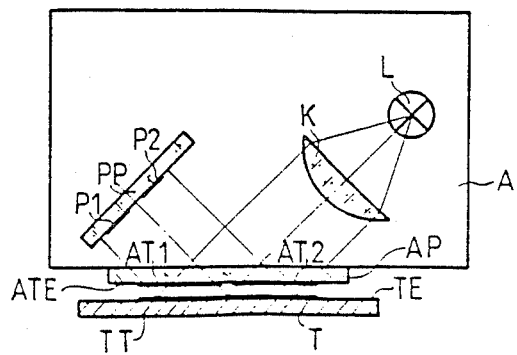
FIG. 2 depicts a graduation carrier and a scanning unit of a length-measuring arrangement in an enlarged cross-sectional view.

In FIG. 2, the graduation carrier TT and the scanning unit A of a length measuring system are shown in an enlarged cross sectional view. In the scanning unit A, beams produced by a light source L are made parallel when passed through a condenser K. The parallel beams pass through a scanning graduation plane ATE containing two scanning graduations AT1, AT2 on a scanning plate AP. The beams are reflected from the graduation plane TE with the graduation T of the graduation carrier TT through the two scanning graduations AT1, AT2 of the scanning plate AP onto two photoelements P1, P2 of a photo-element plate PP. The two scanning graduations AT1, AT2 of the scanning plate AP agree with the graduation T of the graduation carrier TT, but are offset against one another by a fourth of their graduation period. The two photoelements P1, P2 of the photo-element plate PP, which are allocated in each case to the two scanning graduations AT1, AT2 deliver in the measuring movement through the modulation of the light beams through the graduation T and the two scanning graduations AT1, AT2, two periodic scanning signals S1, S2 with a mutual phase displacement of 90°. As shown in FIG. 1, signals S1, S2 are fed to an evaluating means AW comprising impulse-former stages, a counter with a direction discriminator, and a display unit for digital display of the measurement values for the respective relative position of the two shiftable objects.

Figure 3:
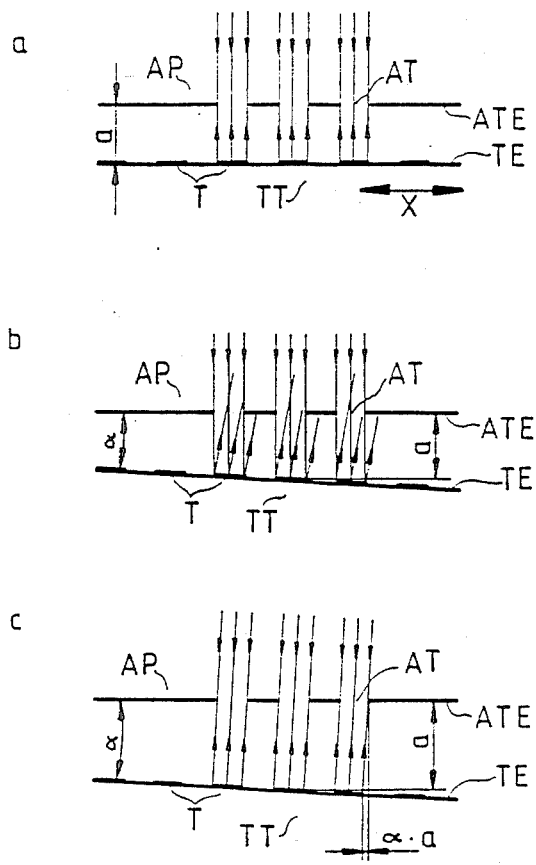
FIG. 3 schematically depicts optical beam paths with parallel and nonparallel graduations.

FIG. 3 schematically represents, in a side view, scanning graduation AT in scanning graduation plate ATE of scanning plate AP, and graduation T in graduation plane TE of graduation carrier TT facing one another at a certain parallel spacing a. Parallel light beams produced in the scanning unit A from light source L and condenser K pass through scanning graduation AT on scanning graduation plane ATE of the scanning plate AP, fall upon graduation plane TE with graduation T of graduation carrier TT, and are reflected from graduation plane TE as a reflection plane back onto scanning graduation plane ATE and scanning graduation AT.

FIG. 3a represents an arrangement of graduation T of graduation carrier TT with respect to scanning graduation AT of scanning plate AP wherein a periodic scanning signal S1, S2 of maximum amplitude is generated. Upon bending of graduation carrier TT while in its use position on the object to be measured, there is produced, according to FIG. 3b, in an arbitrary place of graduation plane TE, an incline of angle $\alpha$, which displaces the image of scanning graduation AT by an interval $2\alpha a$ on scanning graduation plane ATE in the positive measuring direction, $+X$, such that a periodic scanning signal S1, S2 with noticeably reduced amplitude is generated. If graduation carrier TT with graduation T is shifted in a negative measuring direction, $-X$, through the interval $\alpha a$ as shown in FIG. 3c, there may again be obtained a position of graduation T of graduation carrier TT with respect to scanning graduation AT of scanning plate AP wherein a scanning signal S1, S2 of maximum amplitude is produced. Displacement of the image of the scanning graduation AT by the interval $2\alpha a$ on the scanning graduation plane ATE, therefore, is again cancelled; the inclination through the angle $\alpha$ brings about a measuring error, $\alpha a$.

Those skilled in the art will recognize that the distance represented by the equation $\alpha a$ is an approximation of the equation $\tan \alpha$ (a), but $\tan \alpha$ (a)$=\alpha a$ at small angles where $\alpha$ is expressed in radians.

Figure 4:
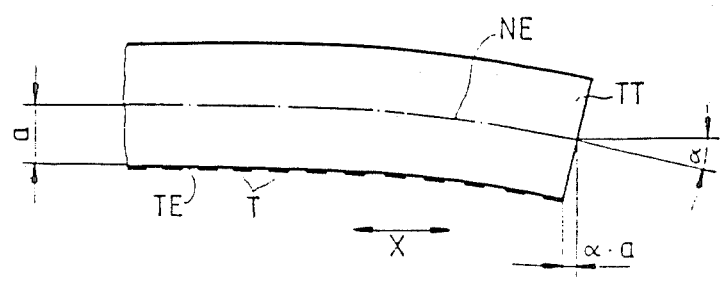
FIG. 4 depicts a bent graduation carrier in an enlarged view.

FIG. 4 shows graduation carrier TT in an enlarged view, in which the neutral plane NE of the graduation plane TE with graduation T presents the same distance a. Upon bending of the graduation carrier TT in its use position on the object to be measured there is yielded in an arbitrary place of the graduation plane TE an incline of the same angle $\alpha$, which displaces the image of the scanning graduation AT, as shown in FIG. 3, by an interval $2\alpha a$ on the neutral plane NE of graduation carrier TT in the positive measuring direction, $+X$, such that—as already explained above—a measuring error aa is experienced. Since, however, upon bending of the graduation carrier TT, the graduation plane TE with the graduation T undergoes, through compression, a shifting in the negative measuring direction, $-X$, by the interval, $\alpha a$, the measuring error $\alpha a$ is again cancelled.

In accordance with the present invention, therefore, it is proposed that the scanning graduation plane ATE with scanning graduation AT of scanning unit A be arranged in the neutral plane NE of the graduation carrier TT.

The scanning graduation plane ATE is arranged and maintained throughout scanning in the neutral plane NE of the graduation carrier TT. Maintaining the scanning graduation plane ATE in the neutral plane NE allows the measuring error, $\alpha a$, to be cancelled by the relatively negative shiting of the graduation plane TE caused by either compression or expansion. Means for maintaining the scanning graduation plane ATE in the neutral plane NE throughout scanning are therefore also contemplated. Maintaining means may comprise, for example, rollers or sliders.

Figure 5:
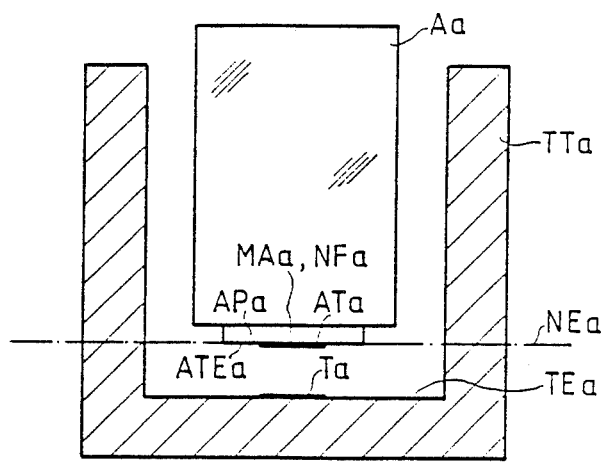
FIG. 5 depicts a first embodiment of an arrangement of the present invention of a scanning unit and a graduation carrier.

FIG. 5 depicts one embodiment of the present invention wherein a graduation carrier TTa has a U-shaped cross section. The graduation plane TEa with graduation Ta lies outside the neutral plane NEa of the graduation carrier TTA. The scanning graduation plane ATEa with scanning graduation ATa of scanning plate APa of scanning unit Aa lies, in contrast, in the neutral plane NEa of the graduation carrier TTa. Thus, according to this embodiment, measuring errors caused by bendings of the graduation carrier TTa while in its use position on the object to be measured are eliminated.

Figure 6:
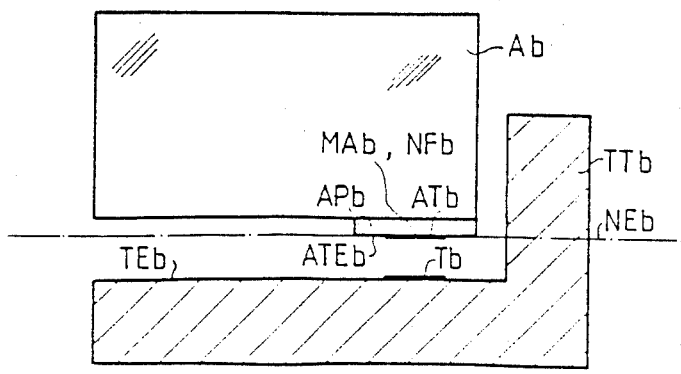
FIG. 6 depicts a second embodiment of an arrangement of the present invention of a scanning unit and a graduation carrier.

FIG. 6 depicts another embodiment of the present invention wherein a graduation carrier TTb has an L-shaped cross section. The graduation plane TEb with graduation Tb lies outside the neutral plane NEb of the graduation carrier TTb. The scanning graduation plane ATEb with scanning graduation ATb of scanning plate APb of scanning unit Ab lies, in contrast, in the neutral plane NEb of the graduation carrier TTb. According to the arrangement of this embodiment, measuring errors caused by bendings of the graduation carrier TTb while in its use position on the object to be measured are eliminated.

In a preferred embodiment of the arrangement of the present invention, the central axes MAa, MAb of the scanning graduations ATa, ATb lie in the neutral fibers NFa, NFb of the neutral planes NEa, NEb of the graduation carriers TTA, TTb. The neutral fibers NFa, NFb run in the measuring direction, X, and form the axes of symmetry of the neutral planes NEa, NEb.

The invention my be successfully used in both incremental and absolute length- or angle-measuring systems.

It is to be understood that a wide range of changes and modifications to the embodiment described above will be apparent to those skilled in the art. It is therefore intended that the foregoing detailed description with respect to the particular embodiments be regarded as illustrative rather than limiting, and that it be understood that it is the following claims including all equivalents which are intended to define the spirit and scope of this invention.

I claim:

1. In a length- or angle-measuring arrangement for measuring the relative position of two objects, in which graduation in a graduation plane of a graduation carrier connected with one of said objects lies outside the neutral plane of the graduation carrier and is scanned by means of a scanning graduation in a scanning graduation plane of a scanning unit connected with the other of said objects, the improvement which comprises, arranging the scanning graduation plane (ATEa; ATEb) with the scanning graduation (ATa; ATb) of the scanning unit (Aa; Ab) in the neutral plane (NEa; NEb) of the graduation carrier (TTa; TTb).

2. A measuring arrangement according to claim 1, wherein the central axis (MAa; MAb) of the scanning graduation (ATa; ATb) is arranged in the neutral fiber (NFa; NFb) of the neutral plane (NE2; NEb) of the graduation carrier (TTa; TTb).

3. A measuring arrangement according to claim 1, wherein the graduation carrier (TTa) comprises a U-shaped cross section.

4. A measuring arrangement according to claim 1, wherein the graduation carrier (TTb) comprises an L-shaped cross section.

* * * * *

UNITED STATES PATENT AND TRADEMARK OFFICE
CERTIFICATE OF CORRECTION

PATENT NO. : 4,743,754
DATED : May 10, 1988
INVENTOR(S) : Alfons Ernst

It is certified that error appears in the above-identified patent and that said Letters Patent is hereby corrected as shown below:

IN THE BACKGROUND OF THE INVENTION

In col. 1, line 26, please delete "on" and substitute therefor --of--.

In col. 1, lines 33 and 34, please delete "lengthmeasuring" and substitute therefor --length-measuring--.

IN THE SUMMARY OF THE INVENTION

In col. 2, line 46, please delete "scananing" and substitute therefor --scanning--.

IN THE DETAILED DESCRIPTION OF THE DRAWINGS AND PREFERRED EMBODIMENTS

In col. 4, line 4, please delete "plate" and substitute therefor --plane--.

In col. 4, line 53, please delete "aa" and substitute therefor --$\alpha$a--.

UNITED STATES PATENT AND TRADEMARK OFFICE
CERTIFICATE OF CORRECTION

PATENT NO. : 4,743,754
DATED : May 10, 1988
INVENTOR(S) : Alfons Ernst

It is certified that error appears in the above-identified patent and that said Letters Patent is hereby corrected as shown below:

In col. 5, line 1, please delete "shiting" and substitute therefor --shifting--.

Signed and Sealed this

Nineteenth Day of June, 1990

Attest:

HARRY F. MANBECK, JR.

*Attesting Officer*   *Commissioner of Patents and Trademarks*